United States Patent

[11] 3,598,300

[72] Inventor Henry B. Katz
33 Westview Road, Short Hills, N.J. 07078
[21] Appl. No. 873,026
[22] Filed Oct. 31, 1969
[45] Patented Aug. 10, 1971

[54] EGG CARTON
5 Claims, 3 Drawing Figs.

[52] U.S. Cl. .................................................. 229/2.5,
229/29 M, 217/26.5
[51] Int. Cl. ...................................................... B65d 1/00
[50] Field of Search ........................................... 229/2.5, 29
M; 217/26.5

[56] References Cited
UNITED STATES PATENTS
Des. 148,824 2/1948 Shepard ....................... 229/2.5 X
3,120,901 2/1964 Boyd ............................ 229/2.5 X
3,217,961 11/1965 Hornbostel ................... 229/2.5

Primary Examiner—Robert B. Reeves
Assistant Examiner—Thomas E. Kocovsky
Attorney—Lerner, David & Behr ABSTRACT: There is provided a novel form of container for eggs. This container is substantially of the same size as ordinary egg containers but is characterized in that the height of the base of each alternate egg receptacle in a row of egg receptacles in the container is raised from the common ground plane of the remaining receptacles in the container. This form of container reduces the risk of breakage of thin shelled, so called "jumbo" eggs, while retaining a size of container which is substantially the same as that utilized in the trade.

PATENTED AUG 10 1971
3,598,300
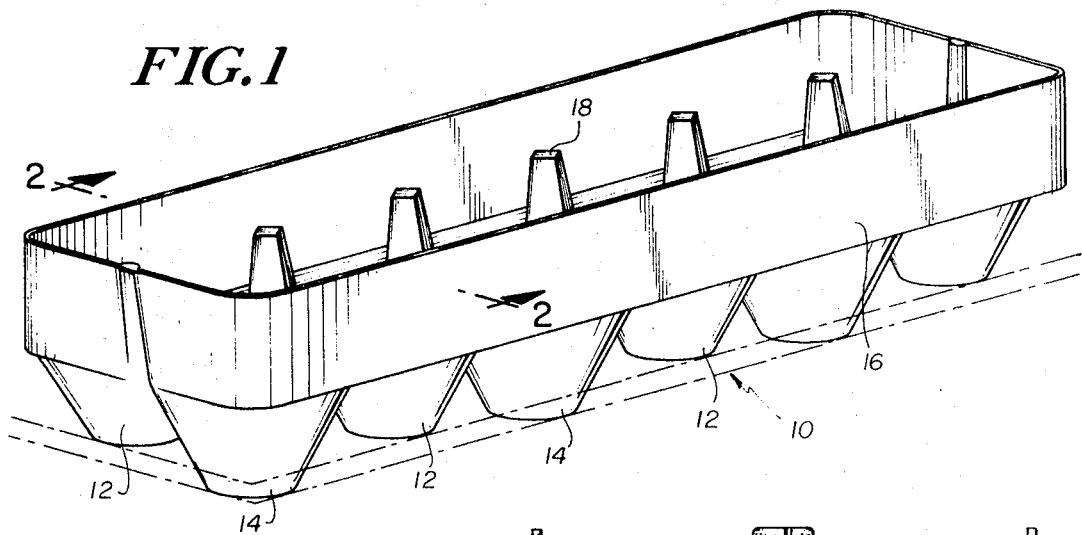
FIG.1
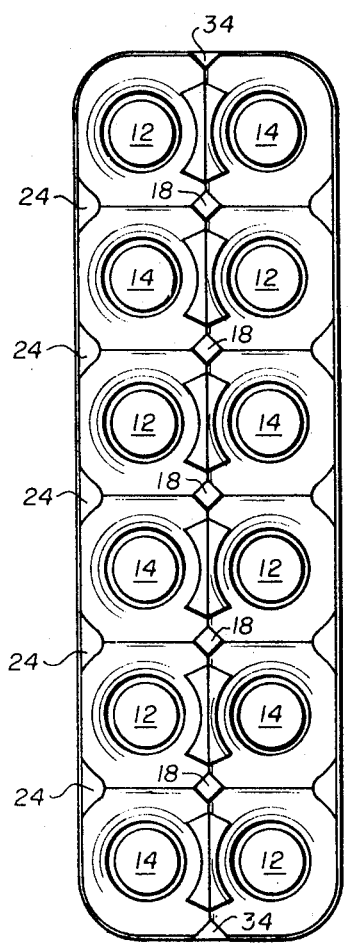
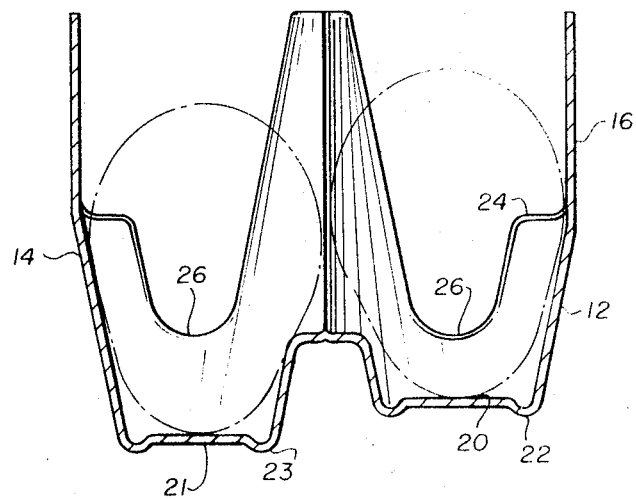
FIG.2
FIG.3
INVENTOR.
HENRY KATZ
BY
LERNER, DAVID & BEHR
ATTORNEYS

EGG CARTON

FIELD OF THE INVENTION

Description of Prior Art

The standard method of packing eggs is to provide for the eggs a container having a receptacle or nesting place for each individual egg. These receptacles are usually of the shape of an inverted frustum of a hollow cone opened at the base and closed at the narrower portion of the frustum. The individual receptacles are separated in the container by spacers of various types. Usually the receptacle are arranged in parallel rows preferably two parallel rows in the container. In one especially preferred modification of the standard box, where such boxes to be used for large eggs, there is placed a conical separator at the juncture of each pair of adjacent receptacles in adjoining rows. This mode of packing has generally been found satisfactory for standard or even large eggs. However, the so-called jumbo eggs create a special problem. Not only are such eggs much larger in overall dimension then the standard or "large" eggs but possess the unfortunate characteristic of being unusually thin shelled. Hence they are extremely sensitive to breakage. Such breakage may occur not only from external impact which is a problem common to all egg containers but also from the bumping of one egg against and adjacent egg within the container. This bumping occurs because of the unusual girth of these eggs which leads to contact or near contact of the widest part of the eggs with their neighbors. A typical carton for large eggs is disclosed in Crabtree U.S. Pat. No. 3,375,966. One approach to the problem of large egg bumping is disclosed in Browr U.S. Pat. No. 2,636,660 wherein the receptacles in the parallel rows in the container are offset laterally so that one egg can nest between two eggs. Olson et al. in U.S. Pat. No. 3,204,848 disclose an egg carton of substantially standard outside dimensions having in place of the usual two rows of receptacles three rows of receptacles wherein the entire center row is vertically offset from the plane of the outer two rows in order to accommodate 14 small eggs within a carton having substantially the same dimensions as a standard one dozen pack carton.

However, the prior art does not disclose a carton having substantially the same outside dimensions as a standard egg carton which contains within its form any specific provision for the reduction of breakage of jumbo eggs. Hence it is deemed desirable to provide such a carton.

SUMMARY OF THE INVENTION

There is provided a novel type of egg carton especially, though not exclusively, suited for the packing of thin-shelled jumbo eggs. The carton of the present invention comprises a container having a plurality of single egg receptacles in parallel rows separated by separators. The receptacles in the container in adjacent rows are located side by side so that a plane passing through the vertical axis of adjacent receptacles in adjoining rows is perpendicular to a plane passing through the vertical axis of the receptacles in a given row.

It is the critical feature of the present invention that the bases of alternate receptacles in a given row have a first common plane designated as the common ground plane which is in contact with the surface upon which the container would rest and a second plane common to the remaining receptacles in that row, which has a level above that of the ground plane. The bases of the receptacles in any given row are therefore staggered in a vertical plane. This stagger also applied to adjacent receptacles in adjoining rows. Thus where a given receptacle has its base on the ground plane the receptacle adjacent to it in the adjoining parallel row has its base on the aforementioned higher plane. Similarly where a given receptacle has its base on the higher plane the receptacle adjacent to it in the adjoining parallel row would have its base on the ground plane. Thus the base of the first receptacle in a given row will have a common plane with the base of the second receptacle in the adjoining row.

While it is not the intention of the present invention to limit the material from which the cartons of the present invention may be manufactured, it is preferred to utilize a shock resistent material. Since cost is an important factor in the manufacture of these containers which fall into the "throw away" category of merchandise, it has been found that molded paper pulp is an especially suitable material from which to construct these cartons.

DESCRIPTION OF THE DRAWINGS

FIG. 1 is a perspective view of the side and top of a container of the present invention.

FIG. 2 is a sectional view of the carton of FIG. 1 viewed at 2-2.

FIG. 3 is a top plan view of the container of FIG. 1.

DESCRIPTION OF THE PREFERRED EMBODIMENTS

The container of the present invention is preferably a container 10 of unitary construction comprising receptacles 12 and 14 in adjoining parallel rows. While the scope of the invention is not to be considered to be so limited, the conventional container has been separated by separators 34 and the adjacent eggs are similarly separated by separators 24. Between each adjacent pair of eggs in adjoining rows it is preferred to place an additional separator 18. This separator preferably upwardly tapered rises substantially above the level of separators 24 and 34 and has, preferably, a conical or pyramidal cross section. In the preferred embodiments these tapered separators, such as pyramid or conical separators do not have an apex but are cut below the apex to give the form of a frustum of a cone or pyramid.

The individual receptacle is designed to provide a nest for each egg. The receptacle comprises walls and a base joining said walls on which the egg may rest. As shown in FIG. 2 the receptacles 12 and 14 have a substantially conical section, again with the apex removed to form a frustum, the flat portion of the hollow frustum parallel to the base of the cone forming the base of the receptacle. It is preferred that the bases 20 and 21 of the receptacles 12 and 14 respectively are slightly raised from the bottom of the receptacle by means of a circumferential annular irregularity 22 or 23. Since the actual base 20 or 21 of the receptacle upon which the egg rest is thus out of direct contact with the surface upon which the container would be placed, the egg is thus further insulated from directed external shock.

In the modification of the invention as illustrated the receptacles 12 and 14 are topped by a vertical circumferential wall 16 which serves to protect the upper portion of the egg in the receptacles from external shock.

In the dividers 24 there are cutouts 26 which permit the wider portion of the egg to bulge slightly out of the receptacle while having the base of the egg upon the base 20 and 21 of the receptacle. As will be seen in FIG. 2 the raising of the base 20 of receptacle 12 over the level of the base 21 of receptacle 14 which rests upon the surface upon which the whole container is, the wide portion of the egg in container 12 is located above the level of the wide portion of the egg in receptacle 14 thus eliminating the possibility of collision between the eggs inside the container thus avoiding breakage.

It should be noted that the bases of receptacles 14 lie on the first common ground plane and the bases receptacles 12 lie on the second common plane on a higher level.

As will be seen from FIG. 2 it will be seen to be immaterial to the scope and concept of the present invention whether the planes designated are those upon which bases 20 and 21 lie or those upon which irregularities 22 and 23 lie.

I claim:

1. An egg carton comprising a container having
    a. a plurality of separate receptacles for each egg,
    b. each of said receptacles having
        1. walls
        2. a base joined to said walls upon which base the egg will rest in said receptacle c. separators, said separators being located between and connected to adjacent receptacles, and being appropriate dimensions to prevent contact between adjacent eggs in such adjacent receptacles, wherein said receptacles are arranged in said container in at least two parallel rows provided that a first vertical plane passing through a first axis of each receptacle in a row is perpendicular to a second vertical plane passing through a second axis of adjacent receptacles in adjoining rows, the improvement wherein the base of each alternate receptacle in any row has a first common plane and each other alternate receptacle base in said row as a second common plane wherein said second common plane has a level above said first common plane, further provided that the base of a first receptacle in a given row have a common plane with the base of a first receptacle in a given row have a common plane with the base of a second receptacle in the adjoining row.

2. An egg carton of claim 1 wherein each egg receptacle is in the form of a hollow inverted frustum of a cone.

3. A carton according to claim 2 wherein the separators at a junction of four receptacles constituting two parts of adjacent receptacles in each of two adjoining rows is upwardly tapered.

4. A carton according to claim 1 wherein the carton is constructed of a substantially shock absorbent material.

5. A carton accordingly to claim 4 wherein said shock absorbent material is molded paper pulp.